May 17, 1927.

J. F. ROBB 1,628,915

CEMENT MEASURING AND WATER PROPORTIONING DEVICE

Filed June 22, 1926  2 Sheets-Sheet 1

Inventor
J.F.Robb

By Robb & Robb & Hill
Attorneys

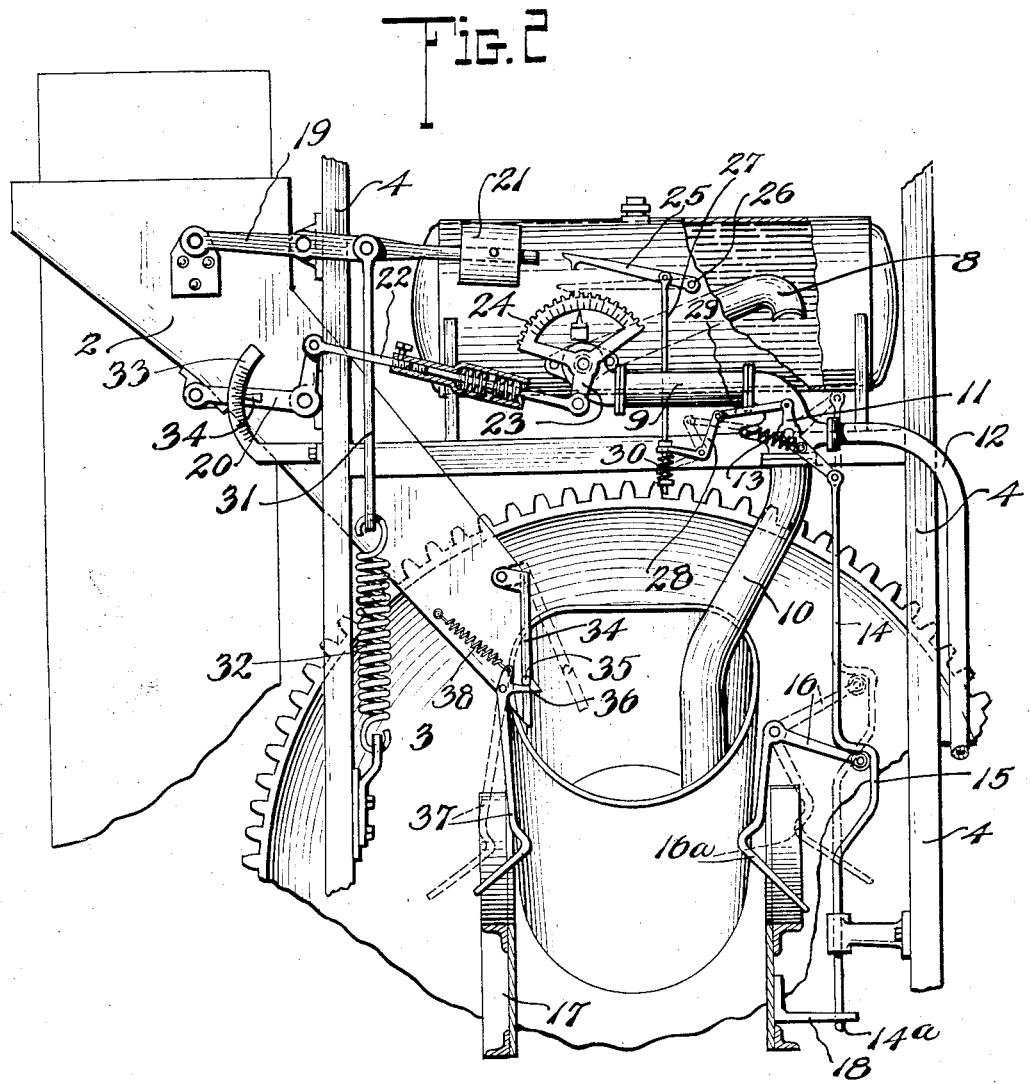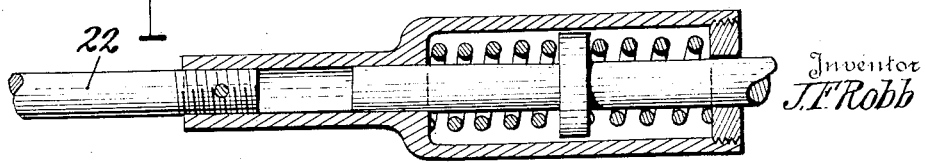

Patented May 17, 1927.

1,628,915

UNITED STATES PATENT OFFICE.

JOHN F. ROBB, OF CLEVELAND, OHIO, ASSIGNOR TO KOEHRING COMPANY, OF MILWAUKEE, WISCONSIN.

CEMENT-MEASURING AND WATER-PROPORTIONING DEVICE.

Application filed June 22, 1926. Serial No. 117,663.

This invention has to do with the proportioning of the quantities of cement and water that may be employed in a mixture of concrete aggregate, ready to be laid down upon a surface after the usual process of agitation in a mixing machine. It is known today that good concrete may be formed if the water and cement ratio is properly determined and the properly proportioned amount of water and cement mixed with a quantity of heavier aggregates usually employed until the mass of aggregate is workable.

The present invention has for its particular object the designing of cement and water proportioning means applicable to concrete mixing machines and operating as a part of the function of such a machine.

In the carrying out of this invention I illustrate two different types of proportioning mechanism, one wherein the cement of a predetermined quantity controls the proportioning of the water by measuring the amount of such water which may be received into a suitable measuring tank, by volumetric measurement action.

A second embodiment of my invention involves the application of cement and water ratio proportioning means to a well known type of water measuring tank wherein is used a measuring pipe that is adapted to feed from the tank a quantity of water determined by the adjustment of the pipe within the tank.

A full understanding of my invention will be had upon reference to the accompanying drawings, and to my copending application for patent Serial Number 107,237, filed May 6, 1926, wherein a type of proportioning mechanism having analogy to the present constructions proposed, is shown and described. In the drawings above referred to:

Figure 2 is a view somewhat enlarged and illustrating the mechanism of this invention as when viewed from the rear of a mixing machine upon which it is mounted, the loading skip being down and the supporting bracket means for the loading skip being illustrated in section, with the drum of the mixer only fragmentarily shown;

Figure 4 is a detail view of a yieldable connection intermediate the cement measuring hopper and the control means for the water measuring instrumentalities.

Figure 1:
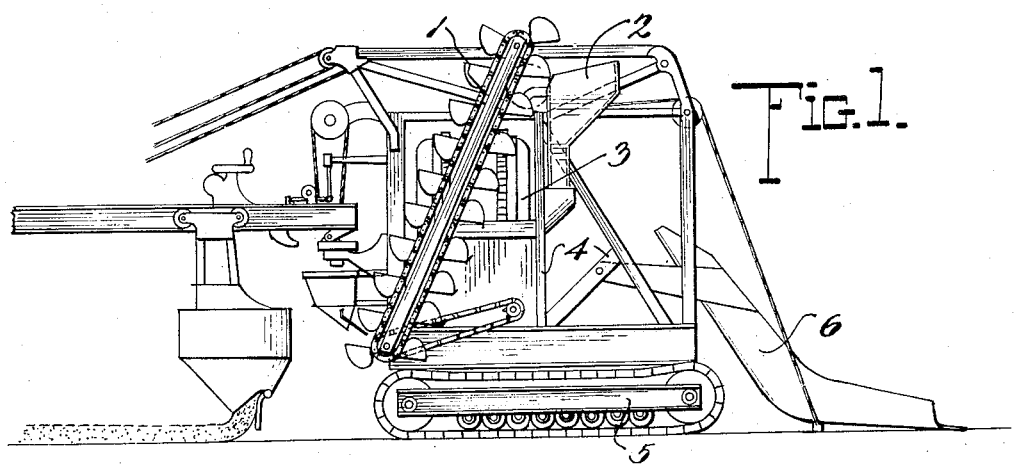
Figure 1 is a side view generally showing a concrete paving machine having my invention applied thereto.

In the illustration of Figure 1 there is depicted a well known type of concrete paver except in relation to the employment in connection with the paver of a certain cement measuring conveyor designated 1 and being of the endless bucket type. The purpose of this conveyor 1 is to elevate and measure cement to the extent that a predetermined quantity of such cement may be fed into the hopper 2 and from the hopper 2 into the mixing drum 3 of the machine. The cement measuring conveyor is set forth in my previous application above identified and functions to carry in each of its buckets the amount of cement usually supplied in the ordinary cubic foot bags or sacks. The conveyor is adapted to operate any automatic or manual control until a certain required number of sacks of cement, or the contents of such sacks of cement, is delivered to the hopper 2, whereupon the conveyor stops operating under automatic control. I do not further describe the construction and operation of the cement measuring conveyor 1 because it forms the subject matter of separate applications for patents and does not necessarily involve the present invention because any suitable type of such conveyor might be employed and I intend that the present improvements shall be understood as cooperative merely with such a type of conveying means.

The conveyor 1 and the hopper 2 are suitably mounted upon the framework 4 of the paver which is supported in the usual way upon a traction base 5. The paver is equipped with the customary loading skip 6 adapted to be elevated to deliver a charge of concrete aggregates from a point adjacent to the subgrade to the drum 3 of the mixing machine. The particular means to operate the skip are immaterial to this invention.

As seen in Figure 2 there is mounted on the uppermost portion of the framework 4 a water measuring tank 7 that may be of a known construction utilizing a measuring pipe 8 therein adjustable up and down to vary the point of stoppage of flow of water from the tank through the pipe, and in this way to measure the amount of water that would flow through the pipe 8, its connected outflow pipe 9, and the downwardly extending pipe 10 which leads to the mixing drum 3. There is interposed in the line of pipes just described a three-way valve of known type, the operating lever of which is designated 11. This three-way valve controls the flow of water from a main line supply pipe 12 through the pipe 9 into the tank 7 and also controls the passage of the water from the tank 7 through the pipes 8, 9 and 10 to the mixing drum. In other words, when the valve lever 11 holds the valve controlled thereby in one position water will flow from the main supply line 12 into the tank 7, and when the valve is in the other of its positions water will flow from the tank 7 to the drum 3. A spring 13 is connected with the valve lever 11 in such a manner as to flip said lever to either of its operating positions when it is actuated by means of a rod 14 connected with one of the arms of said lever. The rod 14 extends downwardly and is provided with an offset 15 in its length engageable by an arm of a bell crank trip lever 16 mounted on the framework of the machine, said trip lever having a trip arm 16ª adapted to be struck by the pivot bracket 17 that supports the skip 6 and connects it with the framework 4 of the machine. As the skip rises and strikes the trip arm 16ª the rod 14 is raised and moves the valve controlled by the lever 11 to its position for causing the water to flow from the tank 7 to the drum 3. On downward movement of the skip 6 a short arm 18 carried by the bracket 17 will at a certain time strike the lower bent end 14ª of the rod 14 and by tilting the valve lever 11 in a position near to that previously referred to the three-way valve will be turned to cut off the supply of water from the tank 7 to the drum and connect the main supply pipe 12 with the tank 7 to replenish the water in the latter, after the well known manner.

We come now to the cement measuring feature of this machine which includes the hopper 2 previously referred to which is movably mounted upon the frame work 4 as by means of an upper lever 19 and a lower bell crank lever 20. The lever 19 is equipped with a counterbalance weight 21 designed to be of sufficient size to about counterbalance the weight of the hopper 2 when it is empty. The lever 20 is connected by a yielding connection 22 including rod and spring means shown in Figure 4 with an operating arm 23 carried by an axis upon which the measuring pipe 8 in the tank 7 is supported. There is connected with the said axis arm 23 a notched sector 24 having cooperation with a locking dog 25 pivotally mounted at 26 adjacent to the tank 7 and attached by means of a rod 27 to a bell crank lever 28. The bell crank lever 28 is connected by a short rod 29 with the valve lever 11. A spring 30 is used in the length of the rod 27 between the lower head of said rod and the lower arm of the lever 28 and affords a resilient means cooperating with the lever 28 in the down pull on the rod 27 that engages the dog 25 with the notched sector 24.

Connected with the upper hopper supporting lever 19 is a rod 31 at the lower end of which is connected the spring 32 which tends to maintain the hopper 2 in an upraised position and which is placed under graduated tensions when cement is fed to the hopper 2 to be weighed therein, practically speaking, such graduated tensions depending upon the amount of cement that is supplied to the hopper. This amount of cement may be varied according to the capacity of the machine or according to the requirements for proper proportioning of the water and cement that are to form a part of the batch of aggregates that are to be mixed in the mixer 3.

Associated with the lower lever 20 supporting the hopper is a graduated scale 33 with which a pointer 34 on the lever may coact as an indicating means for determining the amount of cement received in the said hopper.

Also, at the lower end of the hopper 2 is provided a dumping door 34. This dumping door has a pin 35 engaged by a latch member 36 having the trip arm 37, said latch member normally held in position to engage the pin 35 by a spring 38.

The various parts of the described embodiment of my invention having been set forth, in operation it will be understood that as the conveyor 1, or any other suitable means, supplies a predetermined quantity of cement to the hopper 2, as the latter receives such cement a downward movement of the hopper is caused, dependent upon the particular quantity of cement supplied. As the hopper 2 moves downward a pull is exerted upon the connection 22 that adjusts the measuring pipe 8 in the tank 7 and the greater the amount of cement the greater the adjustment of the pipe to supply a proportionately larger quantity of water for the batch of aggregates to be mixed. When the complete quantity of cement to be used has been fed to the hopper 2 the measuring pipe 8 will be properly adjusted to feed the proportionately required quantity of water to the mixing drum 3.

The skip 6 is now upraised to charge the heavier aggregates of stone and gravel into the drum 3 and as it rises it trips by means of its bracket 17 the trip lever 16, opens communication between the tank 7 and the pipe 10 leading to the drum 3, and simultaneously lowers the dog 25 to engage the sector 24 and lock the pipe 8 against movement while the water feeding action is taking place. Also, about the time the water is supplied to the drum 3 the skip acts upon the trip lever 37 provided for the latch 36, disengages the latch from the door 34 and enables the cement in the hopper 2 to be discharged into the drum 3.

Figure 3:
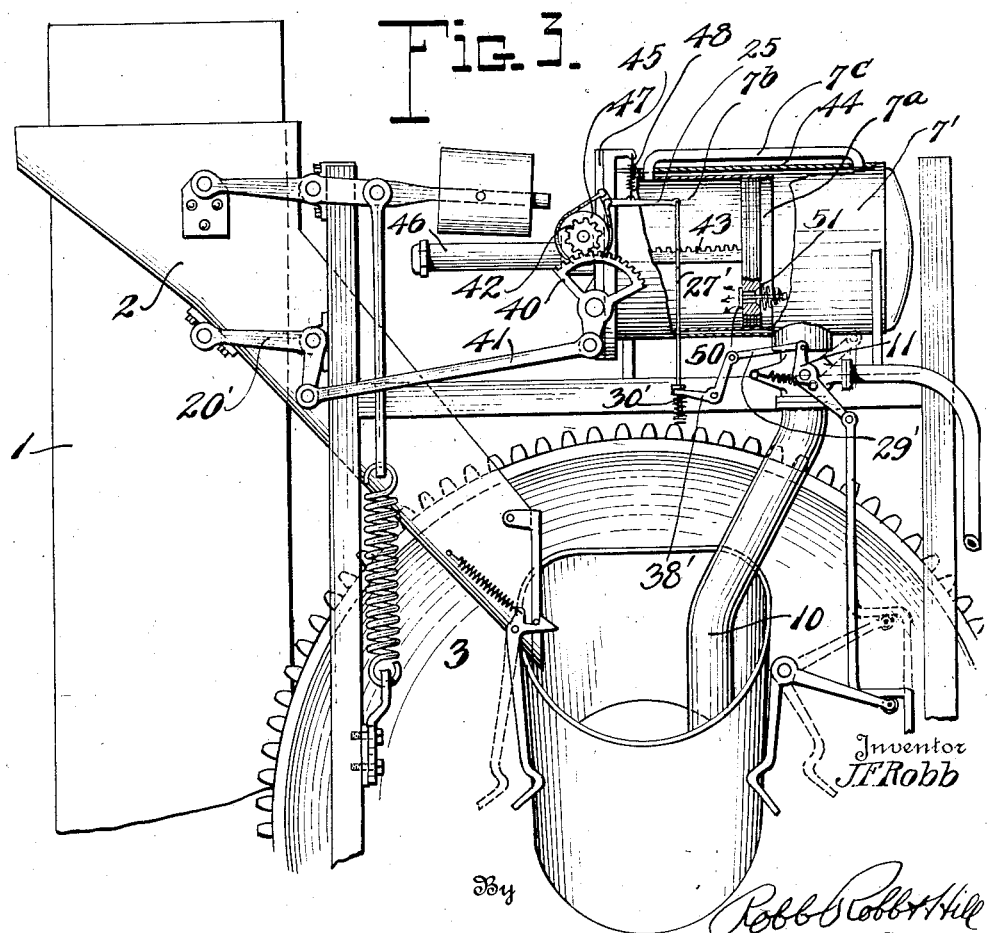
Figure 3 is a view somewhat similar to Figure 2 but not quite as complete as to certain details that are fully illustrated in Figure 2, and showing a modification of the invention.

The mechanism shown in Figure 3 is much the same as that shown in Figure 2 excepting that the movement of the hopper 2 is communicated to an operating toothed sector 40 as by means of the link 41 extending from the lever 20'. The sector 40 actuates the operating gear or pinion 42 which engages with a rack bar 43 that forms the piston rod or actuating part of a measuring piston 44 arranged in the measuring tank 7'.

The measuring tank 7' shown comprises a water-dispensing compartment 7ª with which the supply main and the outflow pipe controlled by the three-way valve means previously described communicates in the manner set forth as to the construction first presented. The movement of the piston 44 is caused to increase or decrease the volumetric capacity of the measuring and dispensing chamber 7ª of the tank. The outer end of the rack bar 43 extends beyond the tank end head 45 and is enclosed by a tubular casing member 46. In accordance with the extent of lowering movement of the cement hopper, movement is imparted to the piston 44 and the greater the amount of cement handled by the hopper the greater will be the capacity of the chamber 7ª, according to the adjustment of the piston 44.

The three-way valve lever is connected by certain parts 29', 28', 30' and 27', such as previously described, with a locking lever 25' which in the present instance is connected with a clutch band 46 that encircles the small clutch drum 47 on the shaft which carries the gear 42. A spring 48 normally tends to raise the lever 25' to hold the clutch band 47 in a position permitting the free movement of the gear 42 under the actuation of the gear sector 40. The clutch band 46 acts to perform substantially the same function as the locking dog or member 25 previously referred to; that is to say, when the valve lever 11 is tripped to open communication between the tank chamber 7ª and the outflow pipe 10 leading to the mixing drum 3 the piston 44 is locked against any movement such as might change the capacity of the chamber 7ª. Moreover, this condition is maintained until the loaded skip 6 restores the lever 11 to its position to replenish the water supplied from the tank 7' at which time the clutch band 46 will be released.

As to the operation of the tank means 7', it is notable that the piston 44 carries a valve 50 which closes against the left hand face of the piston at the valve opening 51 therethrough. This valve prevents the passing of water from the chamber 7ᵇ of the tank 7' through the opening 51 to the chamber 7ª but permits water entering the chamber 7ª to pass through the piston into the chamber 17.

The chamber 7ª handles the water in measured quantities to be supplied to the mixing drum and by reason of the fact that the water when under pressure acts on both sides of the piston 44 the pressure of the water is counterbalanced in the opposite ends of the tank 7'. As the piston 44 moves to the left under actuation of the weight of the cement in the hopper 2, water in the chamber 7ᵇ is adapted to pass through the pipe 7ᶜ into the chamber 7ª. The foregoing provision prevents trapping of the water in the chamber 7ᵇ and enables the employment of the counterbalancing action of the water on the piston.

The details of the tank construction form a separate invention from the present one and are used merely as illustrative of the application of the present invention in the proportioning of the water to the weight of the cement.

Where parts of Figure 3 are not particularly described, it will be understood that these are substantially the same parts as are used in the construction set forth in Figure 2.

Having thus described my invention, what I claim as new is:—

1. In combination, a mixing machine, and a cement and water proportioning means associated therewith comprising a water tank, a cement receptacle, means to supply cement to the receptacle to vary its position according to the weight of the cement therein, a mixing drum, means for supplying water from the tank to the mixing drum, and means for varying the volumetric capacity of the tank in accordance with the movement of the cement receptacle under the influence of cement received in the latter.

2. In combination, a mixing machine comprising a mixing drum, a water tank connected therewith to supply water thereto, a cement receptacle, means for supplying cement to the receptacle, and means for varying the volumetric capacity of the tank in accordance with the amount of cement which is supplied to the cement receptacle.

3. In combination, a mixing machine comprising a mixing drum, a water tank connected therewith to supply water thereto, a cement receptacle, means for supplying cement to the receptacle, and means for varying the volumetric capacity of the tank in accordance with the amount of cement which is supplied to the cement receptacle, the volume capacity means previously referred to comprising a piston device operating in said tank, means movably supporting the cement receptacle, and means for communicating movement of the receptacle to the said piston means.

4. In combination, a mixing machine comprising a mixing drum, a water tank connected therewith to supply water thereto, a cement receptacle, means for supplying cement to the receptacle, means for varying the volumetric capacity of the tank in accordance with the amount of cement which is supplied to the cement receptacle, the volume capacity means previously referred to comprising a piston device operating in said tank, means movably supporting the cement receptacle and means for communicating movement of the receptacle to the said piston means; and means to cause water to flow from the tank to the mixing drum and for at the same time locking said piston means against movement.

5. In combination, a mixing machine comprising a mixing drum, a water tank communicating therewith, valve means controlling the passage of water from said tank to said drum, a water measuring device associated with said tank to vary the quantity of water that may be supplied from the tank to the drum, a cement hopper for receiving a measured quantity of cement, and means for controlling the quantity varying means for the water by the amount of cement which is supplied to said cement hopper.

6. In combination, a mixing machine comprising a mixing drum, a water tank, water measuring means for said tank to vary the quantity of water adapted to be fed therefrom to the mixing drum, a cement measuring receptacle, and means for controlling the action of the water measuring means from said cement measuring receptacle.

7. In combination, a mixing machine comprising a mixing drum, a water tank, water measuring means for said tank to vary the quantity of water adapted to be fed therefrom to the mixing drum, a cement measuring receptacle, means for controlling the action of the water measuring means from said cement measuring receptacle, means for charging aggregates into the mixing drum, and means for effecting passage of water from the water tank to the drum and cement from the cement hopper to the drum controlled from said aggregate charging means.

8. In combination, a mixing machine comprising a mixing drum, a water tank, water measuring means for said tank to vary the quantity of water adapted to be fed therefrom to the mixing drum, a cement measuring receptacle, means for controlling the action of the water measuring means from said cement measuring receptacle, means for charging aggregates into the mixing drum, means for effecting passage of water from the water tank to the drum and cement from the cement hopper to the drum controlled from said aggregate charging means, and means for preventing operation of the water measuring means during the period when the water is being supplied from the tank to the drum.

9. In combination, a mixing machine comprising a mixing drum, a water tank, a water measuring pipe for controlling the amount of water adapted to flow from the tank to the drum and mounted in the said tank, a cement measuring hopper, means for controlling the position of said water measuring pipe in accordance with the quantity of cement supplied to the cement measuring hopper, valve means controlling the passage of water from the tank to the mixing drum, and means for operating said valve means and at the same time controlling the action of the measuring pipe.

10. In combination, a mixing machine, a water tank, a mixing drum supplied with water from said tank, means associated with the tank for variably controlling the quantity of water supplied from the tank to the drum, a cement measuring receptacle, and means for controlling the water supply varying means from said cement receptacle in accordance with the amount of cement received by the latter.

11. A water and cement proportioning machine comprising a water tank, means associated with the water tank to vary the amount of water adapted to be dispensed therefrom, means for discharging the water from the water tank to a predetermined point of use, a cement receptacle, and operative connections between the cement receptacle and the water varying means whereby the quantity of cement received by the cement receptacle may control the action of the water varying means.

12. A water and cement proportioning machine comprising a water tank, means associated with the water tank to vary the amount of water adapted to be dispensed therefrom, means for discharging the water from the water tank to a predetermined point of use, a cement receptacle, operative connections between the cement receptacle and the water varying means whereby the quantity of cement received by the cement receptacle may control the action of the water varying means, means movably supporting the cement receptacle, and means for communicating movement from the cement receptacle to the water varying means to accomplish the controlling action previously referred to.

13. In combination, a movably mounted cement receptacle, a water receptacle, water discharge means for the water receptacle, means associated with the water tank to control the amount of water dispensed therefrom by the water discharge means, means connecting said control means with the cement receptacle so that the control means is operable by the movement of said cement receptacle, and means for holding the cement receptacle in a predetermined position when empty and adapted to be operated by the movement of the receptacle when cement is supplied thereto.

14. In combination, a movably mounted cement receptacle, a water receptacle, water discharge means for the water receptacle, means associated with the water tank to control the amount of water dispensed therefrom by the water discharge means, means connecting said control means with the cement receptacle so that the control means is operable by the movement of said cement receptacle, means for holding the cement receptacle in a predetermined position when empty and adapted to be operated by the movement of the receptacle when cement is supplied thereto, and common means for causing the cement to be discharged from the cement receptacle and for causing the water to be discharged from the water tank.

15. In combination, a water tank, a cement receptacle, means movably supporting the cement receptacle so that it may be moved predetermined distances dependent upon the amount of cement received thereby, means for varying the quantity of water adapted to be dispensed by the water tank and operable by movement of the cement receptacle, means normally maintaining the cement receptacle and the water receptacle in a condition preventing discharge of their contents, and means for opening the cement receptacle and water receptacle to effect discharge of their contents proportioned in relation to each other by the operating means therebetween.

16. In combination, a water tank, a cement receptacle, means movably supporting the cement receptacle so that it may be moved predetermined distances dependent upon the amount of cement received thereby, means for varying the quantity of water adapted to be dispensed by the water tank and operable by movement of the cement receptacle, means normally maintaining the cement receptacle and the water receptacle in a condition preventing discharge of their contents, and means for opening the cement receptacle and water receptacle to effect discharge of their contents proportioned in relation to each other by the operating means therebetween, comprising a device common to the cement receptacle and the water tank.

17. In combination, a water tank, a cement receptacle, means movably supporting the cement receptacle so that it may be moved predetermined distances dependent upon the amount of cement received thereby, means for varying the quantity of water adapted to be dispensed by the water tank and operable by movement of the cement receptacle, means normally maintaining the cement receptacle and the water receptacle in a condition preventing discharge of their contents, and means for opening the cement receptacle and water receptacle to effect discharge of their contents proportioned in relation to each other by the operating means therebetween, comprising a device common to the cement receptacle and the water tank, and including an aggregate loading skip adapted to restore the water tank to closed condition against discharging action of water therefrom.

In testimony whereof I affix my signature.

JOHN F. ROBB.